US011436286B1

United States Patent
Pulaski et al.

(10) Patent No.: US 11,436,286 B1
(45) Date of Patent: Sep. 6, 2022

(54) SYSTEM AND METHOD FOR USING DECONSTRUCTED DOCUMENT SECTIONS TO GENERATE REPORT DATA STRUCTURES

(71) Applicant: Otsuka America Pharmaceutical, Inc., Rockville, MD (US)

(72) Inventors: Beth Pulaski, Voorhees, NJ (US); Paresh Patel, Princeton, NJ (US); Arun Jain, Monroe, NJ (US); Nipa Parikh, Somerset, NJ (US)

(73) Assignee: Otsuka America Pharmaceutical, Inc., Rockville, MD (US)

( * ) Notice: Subject to any disclaimer, the term of this patent is extended or adjusted under 35 U.S.C. 154(b) by 180 days.

(21) Appl. No.: 16/841,626

(22) Filed: Apr. 6, 2020

Related U.S. Application Data

(60) Provisional application No. 62/829,396, filed on Apr. 4, 2019.

(51) Int. Cl.
*G06F 17/10* (2006.01)
*G06F 16/93* (2019.01)
(Continued)

(52) U.S. Cl.
CPC ............ *G06F 16/93* (2019.01); *G06F 16/901* (2019.01); *G06K 9/6215* (2013.01)

(58) Field of Classification Search
CPC ...... G06F 16/93; G06F 16/901; G06K 9/6215
See application file for complete search history.

(56) References Cited

U.S. PATENT DOCUMENTS

| 7,617,451 B2* | 11/2009 | Jones | G06F 40/143 |
| | | | 715/272 |
| 7,698,635 B2* | 4/2010 | Grigoriadis | G06F 40/106 |
| | | | 715/255 |

(Continued)

OTHER PUBLICATIONS

Z. Chen, Y. Wang, Q. Wang, Y. Wang and H. Qu, "Towards Automated Infographic Design: Deep Learning-based Auto-Extraction of Extensible Timeline," in IEEE Transactions on Visualization and Computer Graphics, vol. 26, No. 1, pp. 917-926, Jan. 2020, doi: 10.1109/TVCG.2019.2934810. (Year: 2019).*

(Continued)

*Primary Examiner* — Shahid K Khan
(74) *Attorney, Agent, or Firm* — Pillsbury Winthrop Shaw Pittman LLP

(57) ABSTRACT

Methods, systems, apparatus, and computer programs for generating a report data structure using deconstructed document sections. In one aspect, the method includes actions of obtaining a plurality of deconstructed document sections, determining, for each deconstructed document section, one or more deconstructed document section attributes based on natural language text of the one or more respective deconstructed document sections, identifying one or more report generation rules defining data directed dynamic conditional statements that include operations for generating a report using the plurality of deconstructed document sections, determining, by applying the one or more identified rules defining data directed dynamic conditional statements to the deconstructed document sections, a subset of the plurality of deconstructed document sections that are to be incorporated into a report, and generating a report that includes the subset of the plurality of deconstructed document sections.

20 Claims, 3 Drawing Sheets

(51) Int. Cl.
*G06F 16/901* (2019.01)
*G06K 9/62* (2022.01)

(56) References Cited

U.S. PATENT DOCUMENTS

| | | | |
|---|---|---|---|
| 8,375,293 B2 * | 2/2013 | Rosner | G06F 40/186 |
| | | | 715/255 |
| 8,494,257 B2 * | 7/2013 | Taub | G06V 10/82 |
| | | | 382/311 |
| 8,572,049 B2 * | 10/2013 | Cheung | H04L 63/126 |
| | | | 707/687 |
| 8,788,523 B2 | 7/2014 | Martin et al. | |
| 9,355,150 B1 * | 5/2016 | Bell | G06F 40/103 |
| 9,378,647 B2 | 6/2016 | Bercovitz et al. | |
| 9,594,833 B2 | 4/2017 | Behm et al. | |
| 10,176,251 B2 | 1/2019 | Boule et al. | |
| 10,839,164 B1 * | 11/2020 | Shorter | G16H 10/20 |
| 11,157,475 B1 * | 10/2021 | Cobb | G06F 40/30 |
| 2006/0080278 A1 | 4/2006 | Neiditsch et al. | |
| 2008/0103828 A1 * | 5/2008 | Squilla | G16H 15/00 |
| | | | 715/201 |
| 2008/0320054 A1 | 12/2008 | Howard et al. | |
| 2009/0125875 A1 * | 5/2009 | Schmitter | G06F 8/20 |
| | | | 717/101 |
| 2010/0191748 A1 * | 7/2010 | Martin | G06F 16/335 |
| | | | 707/E17.084 |
| 2011/0289395 A1 * | 11/2011 | Breuel | G06V 30/414 |
| | | | 715/205 |
| 2015/0309965 A1 | 10/2015 | Brav et al. | |
| 2017/0026416 A1 | 1/2017 | Carpenter et al. | |
| 2017/0134828 A1 * | 5/2017 | Krishnamurthy | H04N 21/4532 |
| 2019/0108277 A1 * | 4/2019 | Taneja | G06F 16/3326 |
| 2019/0179889 A1 * | 6/2019 | Ferguson | G06N 7/005 |

OTHER PUBLICATIONS

Jia et al., "Summarizing large-scale, multiple-document news data: sparse methods and human validation," Department of Statistics, Peking University, Dec. 5, 2013, 1-37.

* cited by examiner

US 11,436,286 B1

SYSTEM AND METHOD FOR USING DECONSTRUCTED DOCUMENT SECTIONS TO GENERATE REPORT DATA STRUCTURES

CROSS-REFERENCE TO RELATED APPLICATIONS

This application claims the benefit of U.S. Provisional Patent Application No. This application claims the benefit of U.S. Provisional Patent Application No. 62/829,396 filed Apr. 4, 2019, the entirety of which is incorporated herein by reference.

BACKGROUND

Multiple different entities such as companies, government agencies, non-governmental organizations, and even individuals can maintain sources of data. Such data sources can exist on the same network or different networks.

SUMMARY

A system and method for generating report data structures is disclosed. The system and method for generating report data structures is directed towards automation of report generation using a corpus of documents. The system and method are configured to deconstruct documents in the corpus of documents into one or more deconstructed document sections. A deconstructed document section may include a page, a paragraph, a sentence, one or more phrases, or any other portion of a document. The system and method can determine, for each deconstructed document section, one or more attributes associated with each deconstructed document section.

According to one innovative aspect of the present disclosure, a data processing apparatus for generating a report data structure using deconstructed document sections is disclosed. The data processing apparatus may include one or more processors and one or more storage devices storing instructions that, when executed by the one or more processors, cause the one or more processors to perform operations. In one aspect, the operations may include obtaining, by the data processing apparatus a plurality of deconstructed document sections, determining, by the data processing apparatus and for each deconstructed document section, one or more deconstructed document section attributes based on natural language text of the one or more respective deconstructed document sections, identifying, by the data processing apparatus, one or more report generation rules defining conditional statements that include operations for generating a report using the plurality of deconstructed document sections, determining, by the data processing apparatus and by applying the one or more identified report generation rules to the deconstructed document sections, a subset of the plurality of deconstructed document sections that are to be incorporated into a report, generating, by the data processing apparatus and based on the correlated information, a report that includes the subset of the plurality of deconstructed document sections. In some implementations, generating the report may include determining, by the data processing apparatus, placement within the report of each deconstructed document section of the determined subset of the plurality of deconstructed document sections using the one or more deconstructed document section attributes.

According to one innovative aspect of the present disclosure, a method for generating a report data structure using deconstructed document sections is disclosed. In one aspect, the method can include obtaining, by a data processing apparatus, a plurality of deconstructed document sections, determining, by the data processing apparatus and for each deconstructed document section, one or more deconstructed document section attributes based on natural language text of the one or more respective deconstructed document sections, identifying, by the data processing apparatus, one or more report generation rules defining data directed dynamic conditional statements that include operations for generating a report using the plurality of deconstructed document sections, determining, by the data processing apparatus and by applying the one or more identified rules defining data directed dynamic conditional statements to the deconstructed document sections, a subset of the plurality of deconstructed document sections that are to be incorporated into a report, and generating, by the data processing apparatus, a report that includes the subset of the plurality of deconstructed document sections, wherein generating the report includes determining, by the data processing apparatus, placement within the report of each deconstructed document section of the determined subset of the plurality of deconstructed document sections using the one or more deconstructed document section attributes and, wherein one or more sections of the determined subset of the plurality of deconstructed document sections are modified by input data obtained by the data processing apparatus.

Other versions include corresponding systems, apparatus, and computer programs to perform the actions of methods defined by instructions encoded on computer readable storage devices.

These and other versions may optionally include one or more of the following features. For instance, in some implementations, obtaining, by the data processing apparatus, a plurality of deconstructed document sections can include obtaining, by the data processing apparatus, a plurality of documents, and deconstructing, by the data processing apparatus, the obtained plurality of documents into a plurality of deconstructed document sections.

In some implementations, the plurality of documents can include one or more reports.

In some implementations, the one or more of the plurality of deconstructed document sections can include a whole page, a paragraph, a sentence, a graph element, a chart, a graphical element, one or more phrases, or any other portion of a document.

In some implementations, the input data obtained by the data processing apparatus is data obtained from a document used to generate the one or more deconstructed document sections.

In some implementations, the one or more sections of the determined subset of the plurality of deconstructed document sections are modified by adding data obtained from a data store containing data related to one or more deconstructed document sections.

In some implementations, the one or more sections of the determined subset of the plurality of deconstructed document sections are modified by replacing data contained within one or more sections of the determined subset of the plurality of deconstructed document sections with input data.

In some implementations, the one or more of the plurality of deconstructed document sections includes one or more fields of a template.

In some implementations, the method further includes obtaining input data from a data source, and populating the one or more fields of the template of a particular deconstructed document section using the obtained input data.

In some implementations, the method can further include determining whether each of the obtained deconstructed document sections satisfies a predetermined level of similarity with respect to one or more other previously stored deconstructed document sections, and based on a determination that one or more of the obtained deconstructed document sections satisfies the predetermined level of similarity with respect to one or more other previously stored deconstructed document sections, determining to discard, without storing, the one or more deconstructed document sections that satisfied the predetermined level of similarity.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. Due to the nature of software, functions described above can be implemented using software, hardware, firmware, hardwiring, or combinations of any of these. Features implementing functions may also be physically located at various positions, including being distributed such that portions of functions are implemented at different physical locations.

BRIEF DESCRIPTION OF THE DRAWINGS

Like reference numbers and designations in the various drawings indicate like elements.

DETAILED DESCRIPTION

Figure 1:
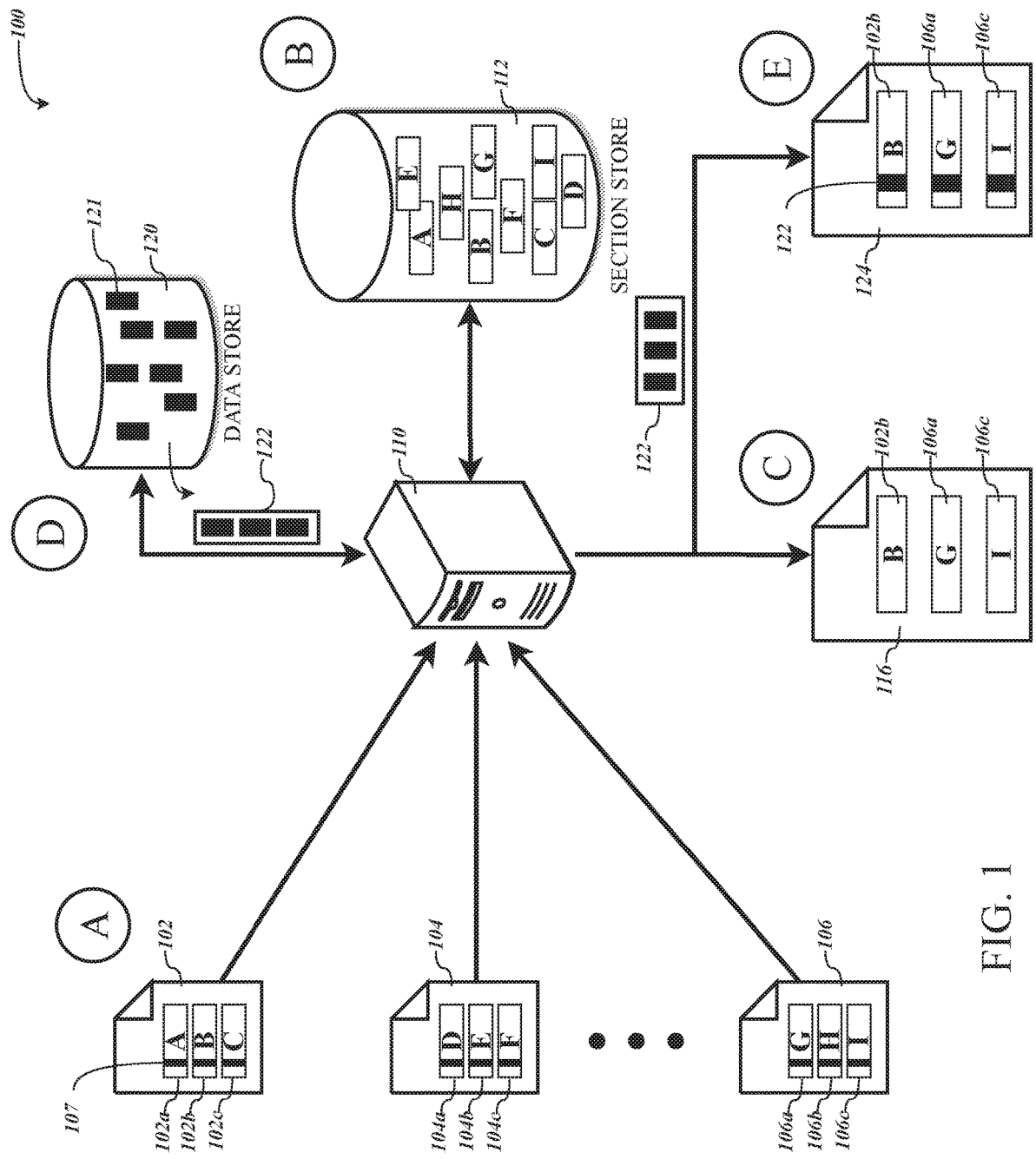
FIG. 1 is a contextual diagram of an example of a system for generating report data structures.

The present disclosure is directed towards automated report generation using a corpus of documents. Instead of storing complete documents for later retrieval and processing, the system of the present disclosure modifies one or more documents to create deconstructed document sections which are then stored. The deconstructed document sections can be any portions of a parent document that together make up the parent document or report. By storing only the deconstructed document section instead of the entire document or report from which the deconstructed document sections are obtained, significant data storage overhead is avoided while maintaining information relevant to the corpus of documents. Furthermore, the deconstructed document sections can have one or more elements removed in order to make a form of a template. With one or more elements removed, the deconstructed document section can then be used to generate a new report. The system of the present disclosure uniquely applies attributes that can describe or otherwise signify elements of the deconstructed document sections. The attributes that describe or otherwise signify elements of the deconstructed document sections can be used to enable effective and dynamic report generation through arrangements of one or more deconstructed document sections into a report template. Templated portions of the one or more deconstructed documents sections can be arranged in a particular order to satisfy any requirements of a particular report to be generated. The report template can then be completed using data from one or more data sources together with the attributes that describe or otherwise signify elements of the deconstructed document sections. As a result, effective automated report generation is possible with minimal data storage overhead.

In addition to the above, the present disclosure can be used to avoid data duplication within one or more data stores that store data related to one or more documents. By deconstructing portions of the document into constituent parts, the system of the present disclosure is able to make a decision as to what portions of a particular document is to be stored. In some cases, a system can store only new are potentially useful portions of one or more documents. In other cases, new portions deconstructed from one or more documents can be reviewed by the system to prevent duplicate entries or portions of documents that are not determined to be likely effective or useful in the generation of automated reports or other processes related to the deconstructed portions of the documents. In some cases, the particular usefulness or predicted effectiveness can be informed by the area of expertise in which automatically generated reports are to be generated. For example, if reports are to be made concerning elements of the health industry, portions of documents that can be effectively applied within the scope of a report concerning the health industry or similar topics can be applied. In this way, the system of the present disclosure can be optimized to store only certain kinds of data or deconstructed portions.

FIG. 1 is a contextual diagram of an example of a system 100 for generating report data structures. The system 100 includes a processing device 110 that is communicably connected to both a section store 112 and a data store 120. The processing device 110 is able to receive input data, process the input data, and store data related to the processing of the input data. The processing device 110 can use either the section store 112, the data store 120, or both the section store 112 and the data store 120 to store data related to the processing of the input data.

In some implementations, the processing device 110 is a type of computer capable of performing one or more commands related to the processing of input data. FIG. 1 illustrates the processing device 110 as a single computer device but the present application is not so limited. For example, the processing device 110 can represent one or more computing devices communicably connected to one another. Elements shown in FIG. 1 can be connected with wires or wirelessly within one or more networks.

FIG. 1 shows a process performed by the system 100 in stages from stage A to stage E. Stage A shows three documents, document 102, document 104, and document 106 being sent to the processing device 110. Although three documents are shown, more documents can be processed, in some implementations, by the processing device 110. Moreover, FIG. 1 shows the documents being sent in Stage A of the diagram but that does not necessarily mean that one or more of the documents are sent simultaneously. One or more documents can be sent at the same time but one or more documents can also be sent at different times. The processing device 110 can receive one or more documents at a certain time and one or more other documents at another time. The processing device is able to receive the sent documents as input data. The processing device 110 is then able to process the input data to create modified data.

In some implementations, documents are sent in a communication transmission from a terminal to the processing device 110. The terminal can be a form of client device such as a mobile device, desktop computer, laptop, cell phone, personal digital assistant, server, embedded computer system, and so forth. In some cases, one or more documents are sent from a given terminal to the processing device 110. In some cases, a communication transmission from the processing device 110 is sent to a terminal resulting in one or more documents or other input data being sent to the processing device 110.

The documents 102, 104, and 106 contain constituent parts that are illustrated visually in FIG. 1. For simplicity, each document only contains three visual representations of constituent parts. The present application is not so limited. In general, a document used in the system 100 can have any number of constituent parts. For simplicity, the constituent parts of the documents will be referred to as sections. The document 102 then is shown with three sections 102a, 102b, and 102c. The document 104 is similarly shown with three sections 104a, 104b, and 104c. And the document 106 is also shown with three sections 106a, 106b, and 106c. The sections of all the documents 102, 104, 106, are marked in stage A with a mark as shown in element 107. The mark 107 is meant to illustrate the fact that the sections of the documents 102, 104, 106 contain data. In particular, the mark shows that the documents 102, 104, 106 contain sections that are filled in without any data or information deliberately modified or deleted from the sections.

Stage B involves the processing device 110 receiving the documents 102, 104, 106 that contain corresponding sections. The processing device 110 processes the input data, in this case the documents 102, 104, 106, to extract information or other forms of data. A section of a document can include a page, a paragraph, a sentence, graph elements, charts, graphical elements, one or more phrases, or any other portion of a document. The processing device 110 can recognize distinguishing features that denote a particular section and extract that portion of a document from the document.

In some implementations, the processing device 110 attempts to identify particular parts of a document. For example, the processing device 110 can identify reference marks within a document such as section headers within a document and parse the document by section headers into one or more sections. For another example, images, such as images denoting an institution within a document, can be identified as a section of the document that can be replaced with other images based on other data inputted into the system or input data.

In some cases, a section can be identified by using a form of keyword search. For example, a section can be identified as a portion of a document with fields or other textual elements that match a search for a particular report type to be generated. Fields corresponding to specific document sections can be searched for in the creation of various forms of documents. In one example, a clinical trial report can be generated from sections with headers or other textual information signifying that the sections are relevant and useful for the generation of the clinical trial report. For example, report sections discussing "outcomes" with corresponding detail can be effective and useful in describing elements of the clinical trial report.

In some implementations, other forms of processing can be used to identify one or more portions of a document. For example, machine learning, types of filtering, or other techniques can be used to parse one or more elements of a document. One or more outputs from the processing of a document can be used to identify one or more portions of a document. In some cases, one or more processing techniques can collaborate on a document to parse one or more elements of the document. For example, a language identification process can identify elements of language within a report and a machine learning model can be used to determine a relationship of one or more of the identified elements of language within the report.

In some cases, once a beginning of a portion of a document that is to become a deconstructed section of the document is identified, a corresponding end to the portion of the document that is to become a deconstructed section of the document can also be identified thus creating a single portion of the document with a beginning and end that can be extracted from the document and further processed or stored within the system 100. In some implementations, headers or section text can be used to identify sections within a document. For example, an abstract portion of a report can be signified by the word "abstract" and subsequent header or section identifier at some point further down a given document to create a portion of the document with a beginning, in this case the word "abstract", and an end, words or phrases identifying a subsequent header or section identifier.

The processing device 110, after extracting sections from the documents 102, 104, 106, deconstructs aspects of the sections. For example, the processing device 110 can remove certain identifying words from a phrase such as a name or a date. The phrase without a name or a date can be considered a form of deconstructed section. In the same example, if the phrase contains a name that has been removed as a part of the process of deconstructing the section, the removed location of the name within the phrase can be given an attribute related to the data that was present before deconstruction or elements in or around the phrase in a document. Other aspects of data within the documents 102, 104, 106 can be given attributes. The attributes can be used to organize or index the extracted sections from the documents 102, 104, 106. The attributes need not be generalized categories based on removed data. Attributes can be determined based on further processing of the documents 102, 104, 106. Attributes can be a form of description for elements of the constituent parts of the documents 102, 104, 106.

In some implementations, the processing device 110 deconstructs the sections before extracting the sections from documents. For example, the processing device 110 deconstructs the data in the form of sections and then takes the deconstructed sections and stores the deconstructed sections in the section store 112. In some cases, deconstruction can involve deleting or removing components of a portion of the document. Deconstruction can take place with or subsequent to extraction of the portion of the document from the parent document.

The processing device 110 sends the extracted sections corresponding to the documents 102, 104, 106 to a storage unit such as the section store 112. The section store 112 can be a form of digital memory that stores data structures representing elements of the extracted sections or other data from the documents 102, 104, 106. The sections stored on the section store 112 include attributes as discussed above that can effectively describe portions of the sections as well as be used for indexing or other forms of organizing and later use.

The sections stored in the section store 112 as shown in FIG. 1 do not show the mark 107 as they did in stage A. As the processing device 110 has modified the sections that are now in the section store 112, the loss of the mark 107 in stage B is meant to illustrate the modifications performed during the extraction and deconstruction process of the processing device 110. In some implementations, the extraction and deconstruction process can render aspects of the documents 102, 104, 106 as a form of template with data missing that can be filled in with other data from one or more other sources. In addition, an extracted or deconstructed section can contain data that is to be changed or otherwise modified based on data from one or more other sources.

Although only sections from the documents 102, 104, 106 are shown in the section store 112, the application is not limited to only storing these sections. For example, the section store 112 can store one or more other elements of data including sections stored from previous processing of input data or data that otherwise became stored on the section store 112.

In some implementations, data extracted from portions of the documents 102, 104, 106 can be sent to the data store 120. For example, a date or name removed from an extracted or deconstructed section of any of the documents 102, 104, 106 can be stored within the data store 120 for future use such as filling in another deconstructed or extracted section from the same or another document.

Stage C involves the processing device 110 further communicating with the section store 112. The processing device 110 can apply one or more rules to determine which of the deconstructed sections are to be included in a new report to be generated. The rules applied by the processing device 110 can differ depending on implementation and can, in some cases, be dynamic in some cases based on the needs of a request from a user or other element connected to the system that requires a report generated from elements of deconstructed sections.

After applying rules to determine which of the deconstructed sections are to be included in a new report, the processing device 110 obtains a subset of the sections stored within the section store 112.

Stage C can also involve associating one or more sections of the subset of the sections stored within the section store 112 with one or more report templates. In some cases, this can involve mapping one or more sections to a given template. Sections may further be associated with report data structures. In some implementations, sections extracted and deconstructed from a particular document may be associated with two or more different report structures.

Once mapped to a particular report template, the processing device 110 can use the attributes of each deconstructed document section to determine a placement of the deconstructed section within a report or report template. For example, based on the attributes of the deconstructed document sections, the processing device can determine that all, or a portion of, a deconstructed document portion should be included in a particular section of a report, at a particular location within a particular section of the report, or the like. The report data structure may be generated in any output format including, but not limited to, a document, a PDF, a spreadsheet, or any other type of report data structure.

A result of stage C in FIG. 1 is a generated report 116 formed from deconstructed sections. In this case, the generated report 116 is formed from the sections 102b, 106a, 106c. In other cases, sections from the document 104 can be included in the generation of a report.

The example of FIG. 1 shows all sections from the documents 102, 104, 106 processed. In some cases, other sources can provide sections to be used in a generated report. For example, an element communicably connected to the processing device 110 or the section store 112 can send sections. The sections can then be used to generate a given report.

Stage D of FIG. 1 shows the data store 120. The data store 120 includes elements of data obtained by the processing device 110 or other element communicably connected to the data store 120. The data stored within the data store 120 is represented by markers similar to the mark 107 illustrated by the element 121. The marks both are meant to illustrate data as it relates to documents, reports, deconstructed sections of documents, or other elements of FIG. 1. The data removed from sections of the documents 102, 104, 106 can be stored in the data store 120. The marks similar to the mark 107 that are not shown in the sections of the section store 112 are shown in the data store 120. Data represented in the FIG. 1 is for illustration purposes only and is not meant to limit the present application.

A data package 122 is sent from the data store 120 to the processing device 110. The data package 122, in this case, is related to the generated report 116. The generated report 116 in this example is a template that requires one or more pieces of data. The data store 120 is equipped with data that can be used within the generated report 116 to create a complete report 124.

Stage E involves the processing device 110 receiving the data package 122 and processing the generated report 116 in order to modify the sections included within the generated report 116 based on the input data that has been stored in the data store 120. The processing device 110 can use attributes or any other data related to the data package 122, the sections of the generated report 116, or the generated report itself to generate the complete report 124 with the data from the data store 120. The complete report 124 can be a form of data structure within any computing architecture of the system 100.

In some implementations, the processing device 110 obtains deconstructed sections separate from a document. For example, the processing device 110 may receive deconstructed sections from another device that is communicably connected to the processing device 110. For another example, a terminal or user may send deconstructed sections or directly input the deconstructed sections into the processing device 110 or storage devices communicably connected to the processing device 110. The processing device 110 can then use the deconstructed sections.

In some implementations, the processing device 110 obtains input data that is not a document or report as shown in FIG. 1. For example, the processing device 110 can obtain input data of a report or other modified form of a document.

Figure 2:
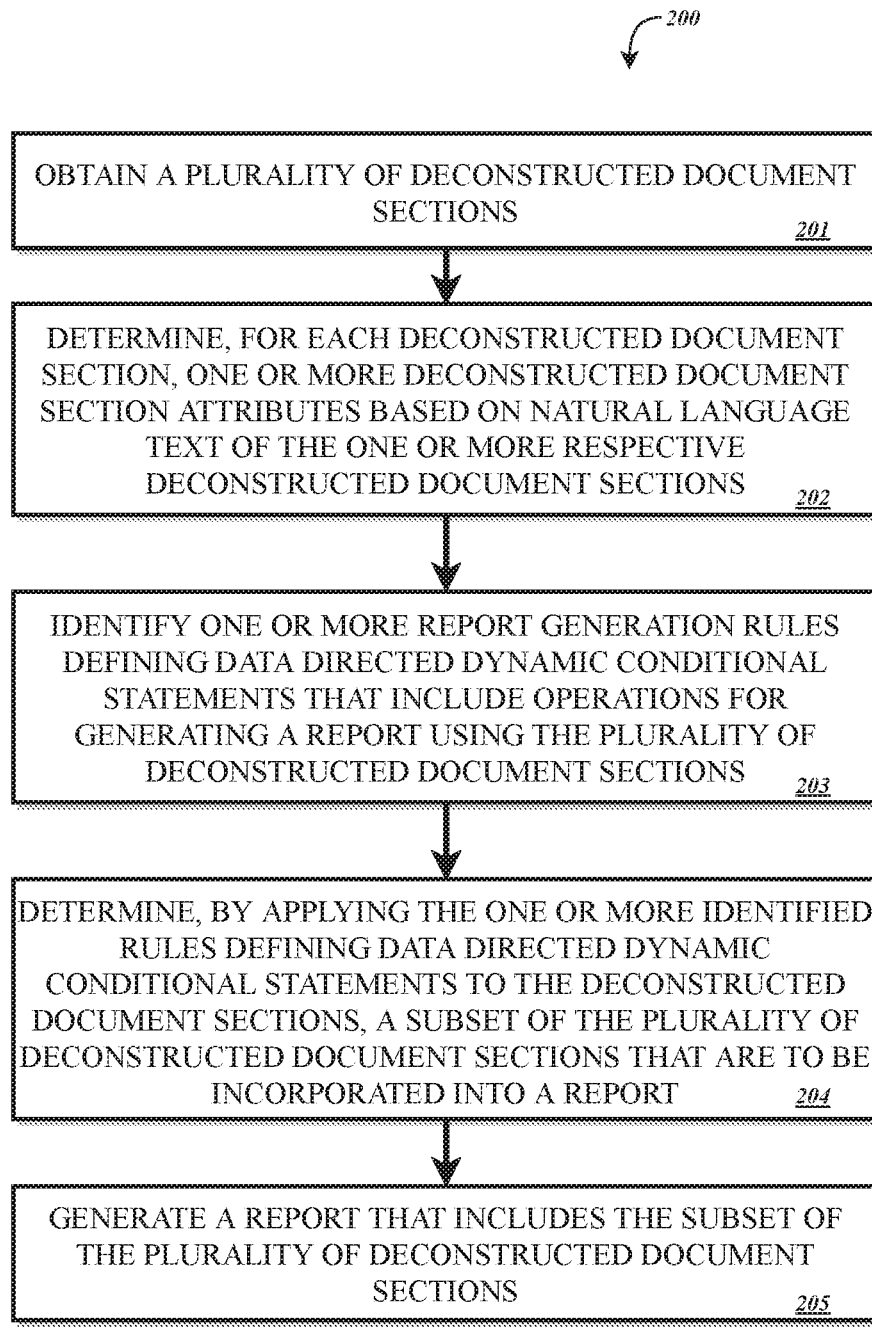
FIG. 2 is a flowchart of an example of a process for generating report data structures.

FIG. 2 is a flowchart of an example of a process 200 for generating report data structures. The process 200 can be performed by one or more systems such as the system 100 of FIG. 1.

The process 200 can include obtaining a plurality of deconstructed document sections (201). For example, the processing device 110 of FIG. 1 obtains deconstructed document sections by deconstructing one or more received documents. The documents can be sent from one or more terminals or other entities communicably connected to the processing device 110. Alternatively, the one or more received documents may include one or more documents obtained from a data storage device. For example, the one or more received documents can include report documents, report templates, or other types of documents.

The process 200 can include determining, for each deconstructed document section, one or more deconstructed document section attributes based on natural language text of the one or more respective deconstructed document sections (202). For example, in determining attributes for one or more deconstructed sections, the processing device 110 can use natural language text or other forms of data to make a determination of the attribute. For example, the processing device 110 of FIG. 1 can determine deconstructed document section attributes based on natural language meaning of terms within a deconstructed document section, national language relationship between terms, phrases, sentences, paragraphs, or the like, in a deconstructed document section, or the like. In some implementations, the processing device 110 of FIG. 1 can determine deconstructed document section attributes based on how the deconstructed document section, as a whole, related to other sections in its parent document. In some implementations, the deconstructed document section attributes can include data that describes or otherwise signifies elements of the deconstructed document sections.

The process 200 includes identifying one or more report generation rules defining data directed dynamic conditional statements that include operations for generating a report using the plurality of deconstructed document sections (203). For example, the processing device 110 of FIG. 1 can work to prepare or work to generate aspects of a report based on elements of deconstructed document sections or deconstructed sections. For example, the processing device 110 can generate conditional statements that define relationships between deconstructed document sections sharing similarity deconstructed document section attributes. In some implementations, a report generation rule can determine, based on the deconstructed document section attributes, deconstructed document sections that are logically related to each other, and when the rule is applied, can result in the mapping of the logically related deconstructed document sections to teach other in a report structure.

The process 200 includes determining, by applying the one or more identified rules defining data directed dynamic conditional statements to the deconstructed document sections, a subset of the plurality of deconstructed document sections that are to be incorporated into a report (204). For example, in Stage C of FIG. 1, the processing device 110 communicates with the section store 112 and performs internal processing involving rules, attributes, and other data available in the system 100. The internal processing can include, for example, filtering or otherwise selecting deconstructed document sections based on attributes, or other conditions, established by the applied rules. In some implementations, application of the one or more identified rules defining data directed conditional statements can also define linkages between unpopulated fields of a deconstructed document section and a one or more fields of the data store 121.

The process 200 includes generating a report that includes the subset of the plurality of deconstructed document sections (205). For example, in Stage C of FIG. 1, the processing device, after choosing a subset of sections from the section store 112, generates the report 116 using the deconstructed sections. In some implementations, the generated report can include one or more deconstructed document sections having one or more unpopulated fields. In such implementations, the one or more fields of the generated report can be populated by identifying and obtaining input data from the data store that can be used to populate the fields. In some implementations, the data from the data store can be obtained based on links between fields of the data store and the unpopulated fields of the deconstructed document sections used to generate the report that were established by the applied rules defining data directed dynamic conditional statements. Alternatively, in some implementations, a deconstructed document section can include content data when input into the report without the need to populate the deconstructed document section further. In some implementations, a combination of the two approaches can be used to generate a report thus requiring some deconstructed document sections of a report to require population of data and some deconstructed document sections to not require further population of data.

Figure 3:
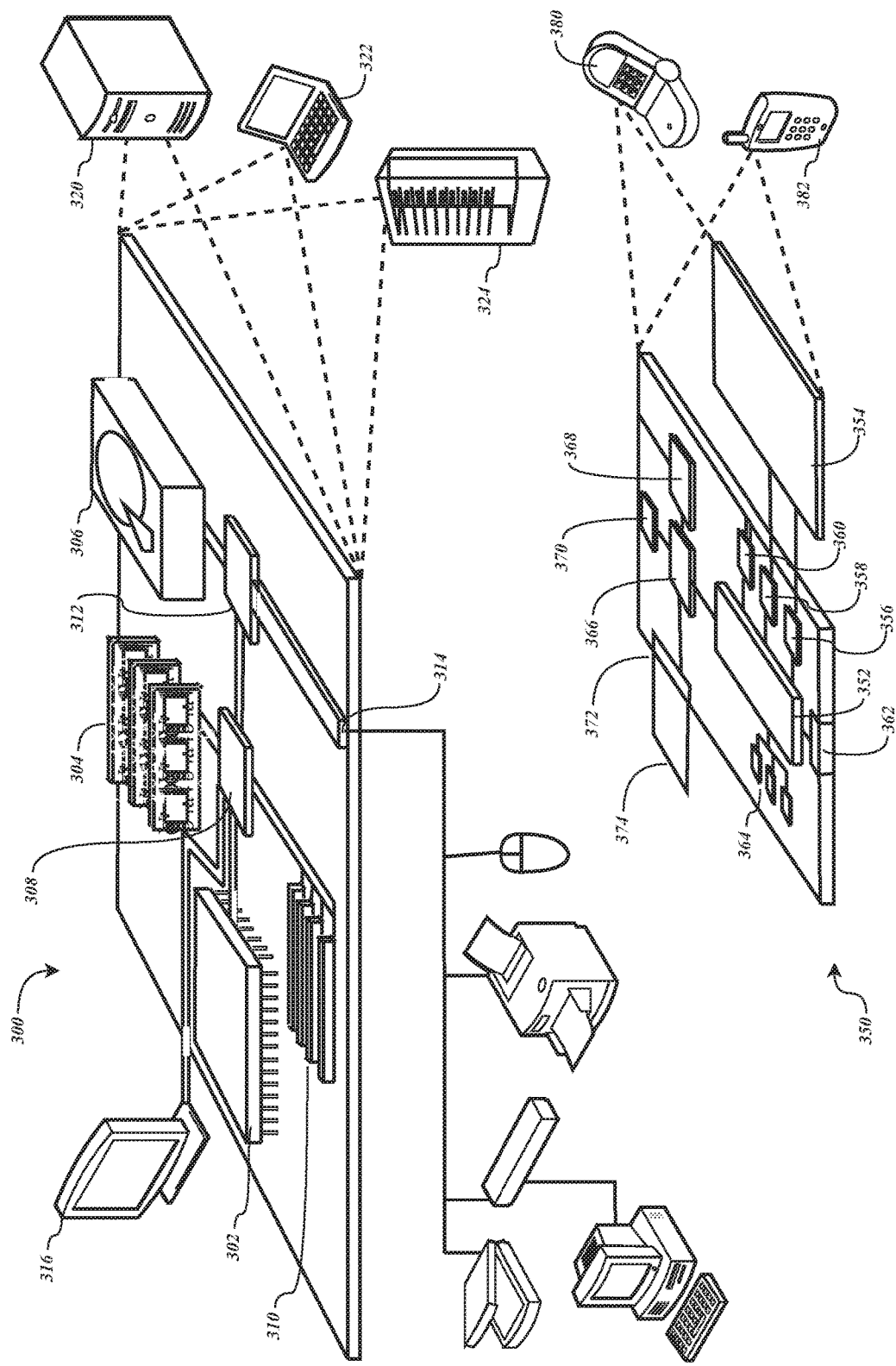
FIG. 3 is a block diagram of system components that can be used in generating report data structures.

FIG. 3 is a block diagram of system 300 components that can be used in generating report data structures.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 308, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and can be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 306 is capable of providing mass storage for the computing device 300. In one implementation, the storage device 306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 306 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provide in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can include secure information also. Thus, for example, expansion memory 374 can be provide as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:
1. A data processing apparatus for generating a report data structure using deconstructed document sections, the data processing apparatus comprising one or more processors and one or more storage devices storing instructions that, when executed by the one or more processors, cause the one or more processors to:
   obtain a plurality of deconstructed document sections;
   determine, for each deconstructed document section, one or more deconstructed document section attributes based on natural language text of the one or more respective deconstructed document sections;
   identify one or more report generation rules defining data directed dynamic conditional statements that include operations for generating a report using the plurality of deconstructed document sections;
   apply the one or more identified rules defining data directed dynamic conditional statements to the deconstructed document sections to identify a subset of the plurality of deconstructed document sections that are to be incorporated into a report;
   generate a report that includes the subset of the plurality of deconstructed document sections, wherein to generate the report comprises:
      determine placement within the report of each deconstructed document section of the determined subset of the plurality of deconstructed document sections using the one or more deconstructed document section attributes and, wherein one or more sections of the determined subset of the plurality of deconstructed document sections are modified by input data obtained by the data processing apparatus.

2. The data processing apparatus of claim 1, wherein to obtain a plurality of deconstructed document sections, the one or more processors are further caused to:
obtain a plurality of documents; and
deconstruct the obtained plurality of documents into a plurality of deconstructed document sections.

3. The data processing apparatus of claim 2, wherein the plurality of documents includes one or more reports.

4. The data processing apparatus of claim 1, wherein one or more of the plurality of deconstructed document sections includes a whole page, a paragraph, a sentence, a graph element, a chart, a graphical element, one or more phrases, or any other portion of a document.

5. The data processing apparatus of claim 1, wherein the input data obtained by the data processing apparatus is obtained from a document used to generate the one or more deconstructed document sections.

6. The data processing apparatus of claim 1, wherein one or more sections of the determined subset of the plurality of deconstructed document sections are modified by adding data obtained from a data store containing data related to one or more deconstructed document sections.

7. The data processing apparatus of claim 1, wherein one or more sections of the determined subset of the plurality of deconstructed document sections are modified by replacing data contained within one or more sections of the determined subset of the plurality of deconstructed document sections with input data.

8. The data processing apparatus of claim 1, wherein one or more of the plurality of deconstructed document sections includes one or more fields of a template.

9. The data process apparatus of claim 8, wherein the one or more processors are further caused to:
obtain input data from a data source; and
populate the one or more fields of the template of a particular deconstructed document section using the obtained input data.

10. The data processing apparatus of claim 1, wherein the one or more processors are further caused to:
determine whether each of the obtained deconstructed document sections satisfies a predetermined level of similarity with respect to one or more other previously stored deconstructed document sections;
based on a determination that one or more of the obtained deconstructed document sections satisfies the predetermined level of similarity with respect to one or more other previously stored deconstructed document sections, determine to discard, without storing, the one or more deconstructed document sections that satisfied the predetermined level of similarity.

11. A method for generating a report data structure using deconstructed document sections comprising:
obtaining, by a data processing apparatus, a plurality of deconstructed document sections;
determining, by the data processing apparatus and for each deconstructed document section, one or more deconstructed document section attributes based on natural language text of the one or more respective deconstructed document sections;
identifying, by the data processing apparatus, one or more report generation rules defining data directed dynamic conditional statements that include operations for generating a report using the plurality of deconstructed document sections;
applying, by the data processing apparatus, the one or more identified rules defining data directed dynamic conditional statements to the deconstructed document sections to identify a subset of the plurality of deconstructed document sections that are to be incorporated into a report;
generating, by the data processing apparatus, a report that includes the subset of the plurality of deconstructed document sections, wherein generating the report comprises:
determining, by the data processing apparatus, placement within the report of each deconstructed document section of the determined subset of the plurality of deconstructed document sections using the one or more deconstructed document section attributes and, wherein one or more sections of the determined subset of the plurality of deconstructed document sections are modified by input data obtained by the data processing apparatus.

12. The method of claim 11, wherein obtaining, by the data processing apparatus, a plurality of deconstructed document sections comprises:
obtaining, by the data processing apparatus, a plurality of documents; and
deconstructing, by the data processing apparatus, the obtained plurality of documents into a plurality of deconstructed document sections.

13. The method of claim 11, wherein one or more of the plurality of deconstructed document sections includes one or more fields of a template.

14. The method of claim 13, the method further comprising:
obtaining input data from a data source; and
populating the one or more fields of the template of a particular deconstructed document section using the obtained input data.

15. The method of claim 11, the method further comprising:
determining whether each of the obtained deconstructed document sections satisfies a predetermined level of similarity with respect to one or more other previously stored deconstructed document sections; and
based on a determination that one or more of the obtained deconstructed document sections satisfies the predetermined level of similarity with respect to one or more other previously stored deconstructed document sections, determining to discard, without storing, the one or more deconstructed document sections that satisfied the predetermined level of similarity.

16. A non-transitory computer-readable medium storing software comprising instructions executable by one or more processors which, upon such execution, cause the one or more processors to:
obtain a plurality of deconstructed document sections;
determine for each deconstructed document section, one or more deconstructed document section attributes based on natural language text of the one or more respective deconstructed document sections;
identify one or more report generation rules defining data directed dynamic conditional statements that include operations for generating a report using the plurality of deconstructed document sections;
apply the one or more identified rules defining data directed dynamic conditional statements to the deconstructed document sections to identify a subset of the plurality of deconstructed document sections that are to be incorporated into a report;
generate a report that includes the subset of the plurality of deconstructed document sections, wherein generating the report comprises:

determine placement within the report of each deconstructed document section of the determined subset of the plurality of deconstructed document sections using the one or more deconstructed document section attributes and, wherein one or more sections of the determined subset of the plurality of deconstructed document sections are modified by input data obtained by the data processing apparatus.

17. The computer-readable medium of claim 16, wherein to obtain a plurality of deconstructed document sections, the one or more processors are further caused to:

obtain a plurality of documents; and deconstruct the obtained plurality of documents into a plurality of deconstructed document sections.

18. The computer-readable medium of claim 16, wherein one or more of the plurality of deconstructed document sections includes one or more fields of a template.

19. The computer-readable medium of claim 18, wherein the one or more processors are further caused to:

obtain input data from a data source; and populate the one or more fields of the template of a particular deconstructed document section using the obtained input data.

20. The computer-readable medium of claim 16, wherein the one or more processors are further caused to:

determine whether each of the obtained deconstructed document sections satisfies a predetermined level of similarity with respect to one or more other previously stored deconstructed document sections; and based on a determination that one or more of the obtained deconstructed document sections satisfies the predetermined level of similarity with respect to one or more other previously stored deconstructed document sections, determine to discard, without storing, the one or more deconstructed document sections that satisfied the predetermined level of similarity.

* * * * *